United States Patent [19]
Hardy

[11] 3,997,048
[45] Dec. 14, 1976

[54] CONVEYOR SYSTEMS

[75] Inventor: Peter D. Hardy, Welwyn Garden City, England

[73] Assignee: Metal Box Limited, Reading, England

[22] Filed: July 17, 1975

[21] Appl. No.: 596,751

[30] Foreign Application Priority Data
July 19, 1974 United Kingdom ............ 32061/74

[52] U.S. Cl. .............................. 198/577; 198/459; 198/681; 198/817
[51] Int. Cl.$^2$ ........................................ B65G 47/31
[58] Field of Search .............. 198/34, 76, 110, 139, 198/190

[56] References Cited
UNITED STATES PATENTS

| | | | |
|---|---|---|---|
| 1,606,166 | 11/1926 | Green et al. ...................... | 198/76 X |
| 3,072,095 | 1/1963 | Keessen et al. .................. | 198/34 X |
| 3,115,237 | 12/1963 | Atkins .................................. | 198/34 |
| 3,289,815 | 12/1966 | Richter et al. ...................... | 198/139 |
| 3,305,069 | 12/1967 | Griner ............................... | 198/34 X |
| 3,751,873 | 8/1973 | Toby ................................... | 18/34 X |

Primary Examiner—John J. Love
Assistant Examiner—Richard K. Thomson
Attorney, Agent, or Firm—Diller, Brown, Ramik & Wight

[57] ABSTRACT

A conveyor handling system is described for separating into discrete batches a stream of articles arriving at regular intervals. The system includes two endless belts extending between first and second locations and arranged to be driven at the same predetermined speed in the same sense. A movable carriage between the first and second locations constrains the intermediate portions of the said endless belts so that one belt forms the upper run of an intermediate portion of the conveyor system and the other belt forms the upper run of the conveyor system both upstream and downstream of the intermediate portion. The carriage is arranged to be reciprocated at a speed greater than the predetermined speed between a first position where the intermediate portion lies adjacent a loading position and a second position where the upstream portion of the conveyor lies adjacent the loading position. When the carriage performs its forward stroke from the first to the second position, the one belt is locked to the carriage so as to be accelerated. When the carriage performs its return stroke the belt is allowed to move freely relative to the carriage and therefore the one belt moves at its predetermined speed.

8 Claims, 3 Drawing Figures

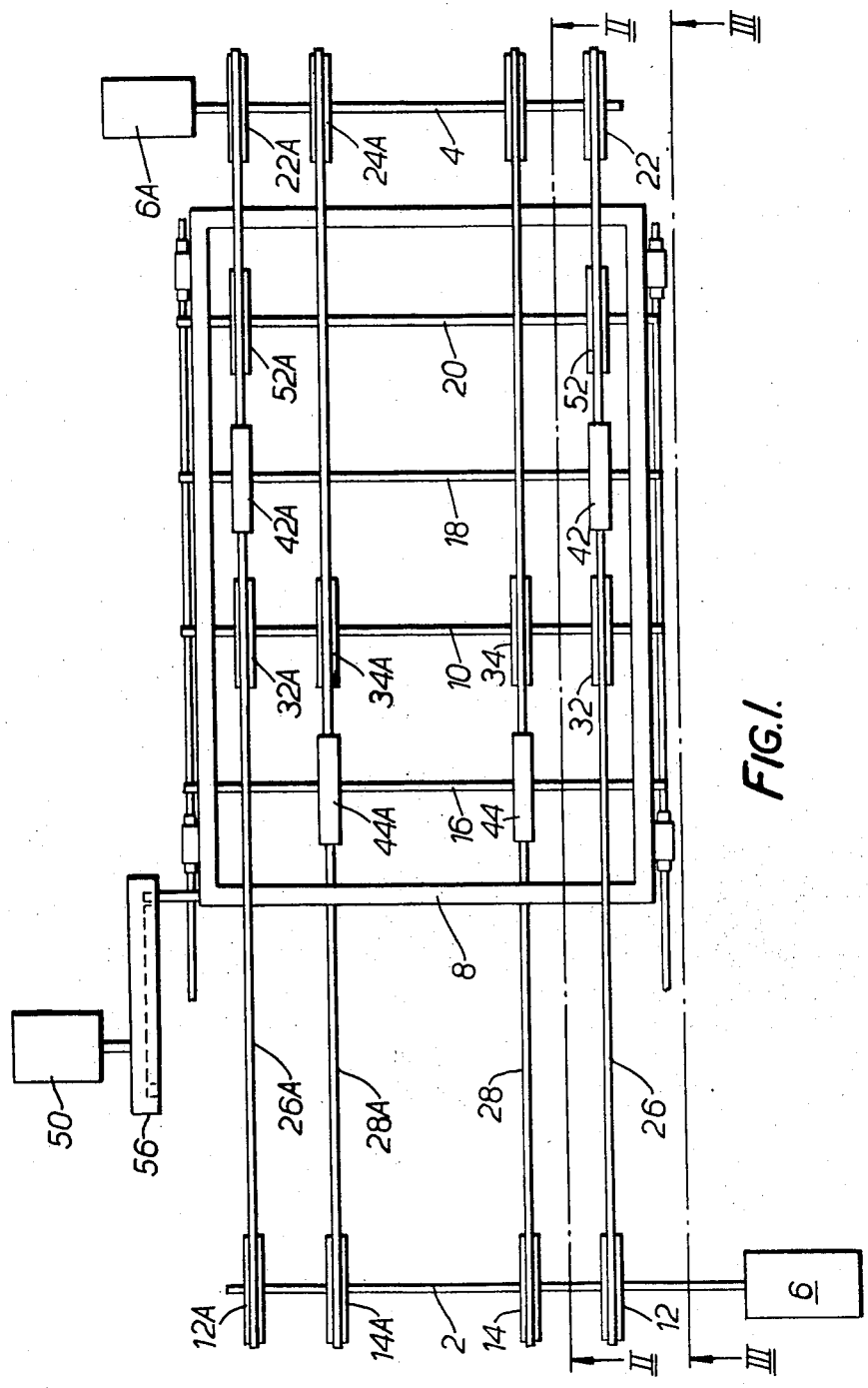
FIG.I.

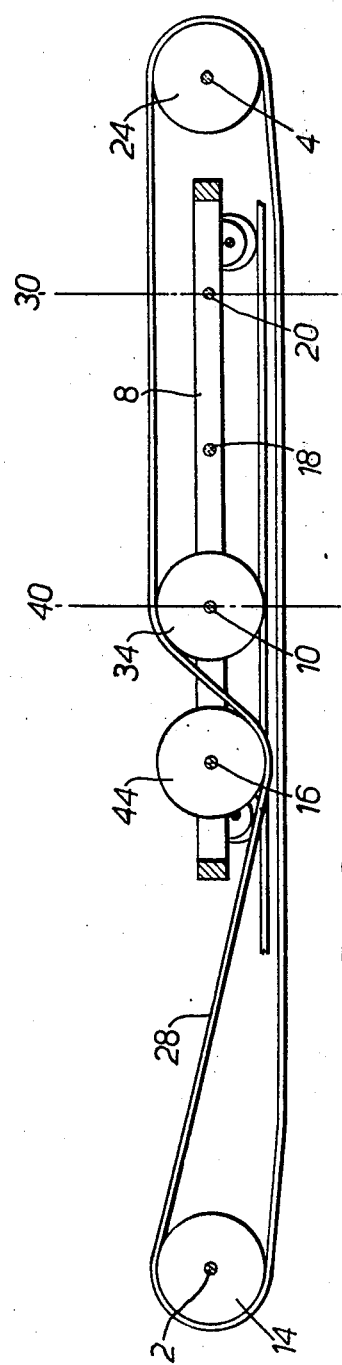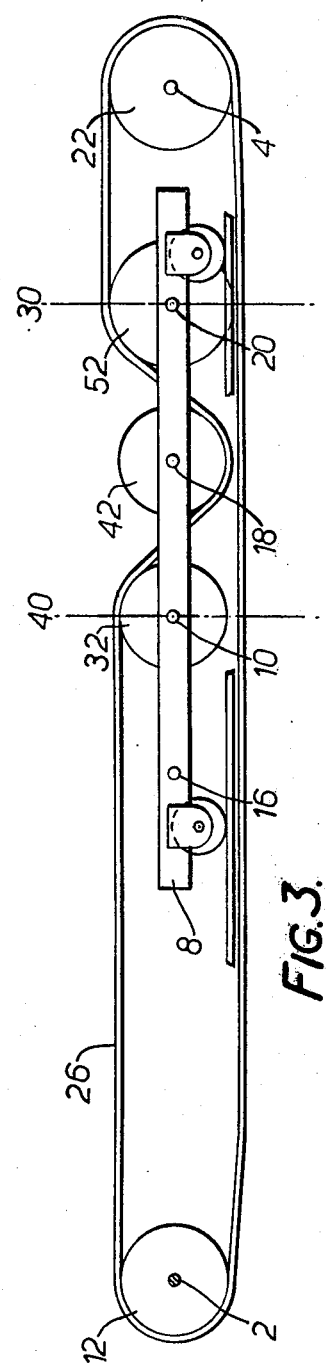

CONVEYOR SYSTEMS

BACKGROUND OF THE INVENTION

1. Field of the Invention

The invention relates to conveyor handling systems.

2. Description of the prior art

In previously proposed conveyor handling systems for separating into discrete batches a stream of articles arriving at regular intervals, articles arriving in a continuous stream and deposited on a conveyor had to be periodically interrupted. Such a system was unsatisfactory since it lacked the speed and efficiency of a continuous process.

It is an object of the present invention to provide a conveyor handling system for separating a continuous stream of articles into batches without interrupting the stream of articles.

SUMMARY OF THE INVENTION

According to the invention, there is provided a conveyor handling system for separating into discrete batches a stream of articles arriving at regular intervals, the system including means defining an upstream conveyor, an intermediate conveyor, and a downstream continuously movable conveyor extending in series between one predetermined position and another, means for displacing the intermediate conveyor which is of constant length between a first and a second position and simultaneously varying the lengths of the upstream and downstream conveyors between the two said predetermined positions so as to maintain a continuous path between the two said predetermined positions without altering the conveying speeds of the upstream and downstream conveyors, the displacement of the intermediate conveyor in a downstream sense including bodily movement downstream of the intermediate conveyor whereby to produce an acceleration in the conveying speed of the intermediate conveyor in the downstream sense while the displacement of the intermediate conveyor in the upstream sense comprising upstream movement of the two ends of the intermediate conveyor without bodily movement of the intermediate conveyor whereby the normal conveying speed of the intermediate conveyor is maintained unaffected, the downstream conveyor being arranged to be driven at a conveying speed greater than the normal speed of the intermediate conveyor means.

According to the invention, there is further provided a conveyor handling system for separating into discrete batches a stream of articles arriving at regular intervals, comprising two endless belts extending between first and second locations and arranged to be driven at the same predetermined speed in the same sense, a carriage movable between the first and second locations and constraining intermediate portions of the said endless belts so that one belt forms the upper run of an intermediate portion of the conveyor system and the other belt forms the upper run of the conveyor system both upstream and downstream of the intermediate portion, means for reciprocating the carriage at a speed greater than the predetermined speed between a first position where the said intermediate portion lies adjacent a loading position at which the stream of articles are to be loaded on to the conveyor system and a second position where the upstream portion of the conveyor lies adjacent the loading position, and means for locking the said one belt to the carriage when the carriage performs its forward stroke from the first to the second position so as to accelerate the said one belt and therefore the intermediate portion and allow the said one belt to move freely relative to the carriage during the return stroke so that the said one belt and therefore the intermediate portion moves at its predetermined speed.

BRIEF DESCRIPTION OF THE DRAWINGS

A conveyor handling system embodying the invention and for shingling meat slices and separating the shingled meat slices into separate batches will now be described by way of example with reference to the accompanying diagrammatic drawings in which:

FIG. 1 is a plan view of the system;

FIG. 2 is a longitudinal section of the system of FIG. 1 taken on the line II—II of FIG. 1; and FIG. 3 is a longitudinal section of the system of FIG. 1 taken on the line III—III of FIG. 1.

DESCRIPTION OF THE PREFERRED EMBODIMENT

The conveyor handling system shown in FIG. 1 is arranged to operate in conjunction with a meat slicer (not shown) which deposits each slice of meat as it is cut onto the upper run of the conveyor system at the upstream and thereof. The conveyor as viewed in FIG. 1 moves from right to left. The conveyor moves at such speed relative to the slicing rate that as the meat slices fall on the moving conveyor, they are automatically shingled (that is, arranged along the conveyor in partially overlapping form).

The conveyor handling system is actuatable in response to a predetermined number of slices of meat being deposited on the conveyor to accelerate the slices in the same direction as that in which they are moving so as to separate them from the next batch of shingled slices which are deposited on the conveyor from the slicer.

As shown in FIG. 1 the conveyor system includes two shafts 2 and 4 lying at opposite ends of the system. The shaft 2 which is arranged to be driven by a motor 6 carries two pairs of pulleys 12, 12A and 14, 14A. The pulleys 12 and 12A are rigid with the shaft 2 while the pulleys 14 and 14A are coupled to the shaft through respective one way clutches incorparated in the pulleys 14 and 14A. The one way clutches are such that when the shaft 2 is driven in a an anticlockwise sense (as viewed in FIGS. 2 and 3) by the motor 6 all four pulleys are driven.

The shaft 4 also carries two pairs of pulleys 22, 22A and 24, 24A. The pulleys 24, 24A are freely rotatable on the shaft 4. Instead a separate shaft can be provided for each pair of pulleys and each pair of pulleys secured to their corresponding shaft.

A movable carriage 8 is supported on rails for movement to and fro between the two shafts 2 and 4. The carriage 8 carries four rotary shafts 16, 10, 18 and 20 which lie spaced from one another and extend parallel to the shafts 2 and 4. The shaft 10 carries two pairs of pulleys 32, 32A and 34, 34A. The pulleys 32 and 32A are rigid with the shaft 10 while the pulleys 34 and 34A are connected to the shaft 10 through one way clutches incorporated in the pulleys 34 and 34A. These one way clutches allow movement of the pulleys 34 and 34A relative to the shaft 10 in the same sense as the clutches associated with the pulleys 14 and 14A allow movement of these relative to the shaft 2. The shaft 16 carries a pair of pulleys 44 and 44A rigid therewith, the shaft 18 carries a pair of pulleys 42 and 42A rigid therewith and the shaft 20 carries a pair of pulleys 52 and 52A rigid therewith.

The pulleys 12, 32, 42, 52 and 22 all lie in the same plane and are linked by an endless belt 26. The pulleys 12A, 32A, 42A, 52A and 22A all lie in the same plane and are linked by an endless belt 26A. The pulley 14, 44, 34, and 24 all lie in the same plane and are linked by an endless belt 28. The pulleys 14A, 44A, 34A and 24A all lie in the same plane and are linked by an endless belt 28A.

The four belts are supported on their correponding pulleys in the manner indicated in FIGS. 2 and 3, the belts 26A and 28A being respectively arranged in the same manner as are belts 26 and 28. As can be seen, the pair of belts 26 are 26A define the downstream portion of the upper run of the conveyor system and the pair of belts 28 and 28A define an intermediate portion of the upper run of the conveyor system. The pair of belts 26 and 26A also form the upstream portion of the upper run of the conveyor system by virtue of their being raised slightly above the level of the rest of the upper run of the conveyor system (as by making the pulleys 52, 52A, 22, 22A of slightly larger diameter).

Thus as shown in FIGS. 2 and 3 the upper run of the conveyor belt is divided into three portions, the upstream and intermediate portions having a junction 30 and the intermediate and downstream portions having a junction 40. Displacement of the carriage 8 to the left hand side as viewed in FIGS. 2 and 3 will simultaneously displace the two junctions in the same direction and so increase the length of the upstream portion and provide a corresponding decrease in the length of the downstream portion of the conveyor. Movement of the carriage 8 in the opposite sense will produce the opposite effect. The intermediate portion remains unchanged in length.

The carriage is arranged to reciprocate between a fixed upstream position and a fixed downstream position under the action of a cam mechanism 56 which is coupled to operate in synchronism with the meat slicer.

In operation slices of meat fall continuously and at regular intervals from the slicer onto a datum position on the conveyor which at this point in time is assumed to be occupied by the intermediate portion of the conveyor. Since all four belts are being driven by the motor 6 at the appropriate speeds, the slices falling on the belt will automatically be shingled. After a predetermined number of slices have fallen on the intermediate portion, the cam mechanism 56 is actuated by control means 50 to shoot the carriage into its downstream position. The speed with which the carriage is displaced is faster than the speed at which the belts are driven by the motor 6. Accordingly, the two belts 28 and 28A are locked to the carriage 8 by virtue of one way clutches of the pulleys 34, 34A and displaced relative to the belts 26 and 26A in the downstream direction. This accelerates the slices of meat so fast away from the datum position that the next slice to fall from the slicer now falls on the upstream portion of the conveyor to start a fresh batch of shingled slices.

When the carriage reaches its downstream position, the belts 28 and 28A resume their movement under the action of the motor 6. Thereafter the carriage 8 is returned to its upstream position to cause the separated batch of shingled slices to be transferred to the downstream portion of the conveyor and to cause the second batch of meat slices to be transferred to the intermediate portion of the conveyor.

The return movement of the carriage does not affect the speed of the belts 28 and 28A since the one way clutches of the pulleys 34, 34A will allow those pulleys rotate freely relative to the shaft 10.

The conveyor handling system is now ready for another cycle.

The two belts 26 and 26A are arranged to be intermittantly accelerated so that they move slightly faster than the belts 28 and 28A during the interval that the slices are falling on the belts 28 and 28A and thereby avoid bunching the batches of slices when they are transferred from the intermediate portion of the conveyor to the downstream portion. This can be achieved by providing one way clutches between the pulleys 12, 12A and 22, 22A and their respective shafts by overdriving the shaft 4 during that interval in the anticlockwise direction (FIGS. 2, 3) by a motor 6A.

The endless belts are preferable of circular cross-section and made of polyurethane.

It will be appreciated that the conveyor system which acts to separate a continuous stream of meat slices into batches can be used to handle articles other than slices of meats.

I claim:
1. A conveyor handling system for separating into discrete batches a stream of articles arriving at regular intervals at a predetermined dropping position, the system including
    conveyor means providing an upstream, variable length conveyor portion, an intermediate, constant length conveyor portion, and a downstream, variable length conveyor portion, the said conveyor portions extending in series to provide a transport path between the dropping position and a further predetermined position downstream of the same,
    drive means for the conveyor means and arranged to normally drive the said intermediate conveyor portion at a conveying speed equal to the conveying speed of the upstream conveyor portion, and
    carriage means coupling the conveyor means and defining the intermediate conveyor portion as extending from the upstream to the downstream portions and moveable between predetermined upstream and downstream conveyor positions so as correspondingly and respectively to displace the intermediate conveyor portion between an upstream position in which it receives the said stream of articles thereon and a downstream position in which the stream is received on the upstream conveyor portion,
    such displacement of the intermediate conveyor portion to its said downstream position including bodily movement downstream of the respective part of the conveyor means at the speed of displacement whereby to produce an acceleration in the conveying speed of said articles received thereon, such displacement of the interemdiate conveyor portion to its said upstream position occurring while the said normal conveying speed of the intermediate conveyor portion in the downstream direction is maintained,
    the said drive means being effective to drive the downstream conveyor portion at a conveying speed greater than the movement of the intermediate conveyor portion at its said normal conveying speed during the time that the intermediate conveyor portion is at the upstream position thereof.

2. A conveyor handling system for separating into screte batches a stream of articles arriving at regular tervals, comprising two endless belts extending between first and second locations, means for driving the two endless belts at the same predetermined speed in the same sense, a carriage movable between the first and second locations and guiding intermediate portions of the said endless belts so that one belt forms the upper run of an intermediate portion of the conveyor system while the other belt forms the upper run of the conveyor system both upstream and downstream of the intermediate portion, means coupled to the carriage to reciprocate the carriage at a speed greater than the predetermined speed between a first, upstream position where the said intermediate portion lies adjacent a loading position at which the stream of articles are to be loaded onto the conveyor system and a second, downstream position where the upstream portion of the conveyor lies adjacent the loading position, and means for locking the said one belt to the carriage when the carriage performs its forward stroke from the first to the second position so as to accelerate the said one belt and therefore the intermediate portion and allow the said one belt to move freely relative to the carriage during the return stroke so that the said one belt and therefore the intermediate portion moves at its predetermined speed.

3. A system according to claim 2, including means for selectively accelerating the said other belt during the period that the intermediate portion lies adjacent the loading position.

4. A system according to claim 2, wherein the upper run of the upstream portion of the conveyor lies in a plane higher than the plane containing the upper run of the intermediate portion of the conveyor.

5. A system according to claim 2, wherein the locking means comprises a conveyor belt pulley around which pulley said one belt extends, said pulley incorporating a one way clutch mounting the pulley on the carriage.

6. A system according to claim 2, wherein said endless belts are of circular cross-section.

7. A system according to claim 2, wherein said endless belts are of polyurethane.

8. A system according to claim 2, wherein the reciprocating means comprises a cam mechanism.

* * * * *